United States Patent
Ouammi et al.

(10) Patent No.: US 11,352,268 B2
(45) Date of Patent: Jun. 7, 2022

(54) MICROGRID POWERED SELF-WATER PRODUCING INTERCONNECTED GREENHOUSES

(71) Applicant: QATAR UNIVERSITY, Doha (QA)

(72) Inventors: Ahmed Ouammi, Doha (QA); Oumaima Choukai, Kénitra (MA); Driss Zejli, Kénitra (MA)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 16/995,261

(22) Filed: Aug. 17, 2020

(65) Prior Publication Data

US 2022/0048793 A1 Feb. 17, 2022

(51) Int. Cl.
*C02F 1/14* (2006.01)
*B01D 1/00* (2006.01)
(Continued)

(52) U.S. Cl.
CPC .............. *C02F 1/14* (2013.01); *B01D 1/0035* (2013.01); *B01D 1/0082* (2013.01); *B01D 1/14* (2013.01);
(Continued)

(58) Field of Classification Search
CPC .... C02F 1/047; C02F 1/08; C02F 1/10; C02F 1/12; C02F 1/14; B01D 1/065; B01D 1/14; B01D 1/16
(Continued)

(56) References Cited

U.S. PATENT DOCUMENTS

| 4,402,793 A | * | 9/1983 | Petrek | .................. C02F 1/14 |
| | | | | 202/174 |
| 4,704,189 A | * | 11/1987 | Assaf | .................. B01D 1/14 |
| | | | | 159/48.2 |

(Continued)

FOREIGN PATENT DOCUMENTS

| CN | 108476823 A | 9/2018 |
| GB | 2576953 A | 3/2020 |

OTHER PUBLICATIONS

T. Akinaga et al., "Brine Utilisation for Cooling and Salt Production in Wind-Driven Seawater Greenhouses: Design and Modelling", Desalination 426 (2018), pp. 135-154, www.elsevier.com/locate/desal, http://dx.doi.org/10.1016/j.desal.2017.10.025.

(Continued)

*Primary Examiner* — Jonathan Luke Pilcher
(74) *Attorney, Agent, or Firm* — Squire Patton Boggs (US) LLP

(57) ABSTRACT

Certain embodiments may provide a method for controlling a desalination system. The method may include performing a desalination procedure with salt-water in a desalination compartment of the desalination system. The method may also include extracting brine and freshwater from the desalination procedure. The method may further include directing the brine to a brine treatment compartment of the desalination system, and the freshwater to a firewater container. In addition, the method may include performing a brine treatment procedure in the brine treatment compartment. Further, the method may include collecting concentrated brine from the brine treatment compartment.

7 Claims, 9 Drawing Sheets

(51) Int. Cl.
*B01D 5/00* (2006.01)
*C02F 1/04* (2006.01)
*F24F 6/00* (2006.01)
*B01D 1/14* (2006.01)
*B01D 1/22* (2006.01)
*C02F 103/08* (2006.01)

(52) U.S. Cl.
CPC ............... *B01D 1/22* (2013.01); *B01D 5/006* (2013.01); *C02F 1/047* (2013.01); *C02F 1/048* (2013.01); *F24F 6/00* (2013.01); *C02F 2103/08* (2013.01)

(58) Field of Classification Search
USPC ................................................ 159/4.01, 4.09
See application file for complete search history.

(56) References Cited

U.S. PATENT DOCUMENTS

| 10,022,646 | B1* | 7/2018 | Almotlaq | B01D 1/28 |
| 11,098,926 | B2* | 8/2021 | Lakic | F28D 15/00 |
| 2014/0197022 | A1* | 7/2014 | Antar | C02F 1/14 |
| | | | | 202/174 |
| 2015/0223409 | A1 | 8/2015 | Abahusayn | |
| 2018/0224164 | A1* | 8/2018 | Lakic | F24S 90/00 |

OTHER PUBLICATIONS

Lidia Roca et al., "Predictive Control Applied to a Solar Desalination Plant Connected to a Greenhouse with Daily Variation of Irrigation Water Demand", Energies 2016, 9, 194, 17 pages, doi:10.3390/en9030194, www.mdpi.com/journal/energies.

* cited by examiner

MICROGRID POWERED SELF-WATER PRODUCING INTERCONNECTED GREENHOUSES

FIELD

Some embodiments may generally relate to internal combustion engine emissions control systems. More specifically, certain embodiments may relate to apparatuses, systems, and/or methods for microgrid powered interconnected greenhouses self-water producing through an enhanced desalination process.

BACKGROUND

Transitioning from traditional to precision and smart agriculture has opened new challenges and perspectives regarding the development of efficient decision-making, and management tools where the main objective is saving energy and water. In this context, sustainable greenhouses are defined as a new and innovative solution to cope with challenges of the agriculture development. A sustainable greenhouse may be represented as an active actor that may have a fundamental part in the transition to precision agriculture by providing efficient design, management solutions, and original decision-support tools. Thus, there is a need to develop a cooperative network of interconnected self-water producing smart greenhouses that are integrated into a microgrid. There is also a need to take advantage of advancements in smart grids, artificial intelligence, and control techniques to improve sustainable water/energy supply, and support the agriculture to meet the growing number of regulations on environment and quality, as well as minimizing the effects of climate changes.

SUMMARY

Certain embodiments may be directed to a method for controlling a desalination system. The method may include performing a desalination procedure with salt-water in a desalination compartment of the desalination system. The method may also include extracting brine and freshwater from the desalination procedure. The method may further include, directing the brine to a brine treatment compartment of the desalination system, and the freshwater to a freshwater container. In addition, the method may include performing a brine treatment procedure in the brine treatment compartment. Further, the method may include collecting concentrated brine from the brine treatment compartment.

Other embodiments may be directed to a desalination system. The desalination system may include a solar water heater configured to receive freshwater from a condenser. The desalination system may also include a first evaporator fluidly connected to the condenser. The desalination system may further include a heat exchanger configured to receive the cooled and humidified air from the first evaporator and heat the cooled and humidified air. Further, the desalination system may include a second evaporator receive the heated humidified air from the heat exchanger, and humidify the heated humidified air until a saturation point is reached. In certain embodiments, the heat exchanger may be fluidly connected to the solar water heater, and configured to receive warm freshwater from the solar water heater. In other embodiments, the heat exchanger may be disposed between the first evaporator and the second evaporator.

Other embodiments may be directed to a brine treatment system. The brine treatment system may include a wind-aided intensified evaporation unit, wherein the wind-aided intensified evaporation unit comprises a plurality of vertical plastic films, a wall surface enclosing the plurality of vertical plastic films, and an inclined bottom surface. The brine treatment system may also include a solar pond fluidly connected to the wind-aided intensified evaporation unit. In certain embodiments, the solar pond may include a plurality of compartments separated by a plurality of partition walls.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION

It will be readily understood that the components of certain example embodiments, as generally described and illustrated in the figures herein, may be arranged and designed in a wide variety of different configurations. The following is a detailed description of some embodiments for microgrid powered interconnected greenhouses self-water producing through an enhanced desalination process.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Figure 1:
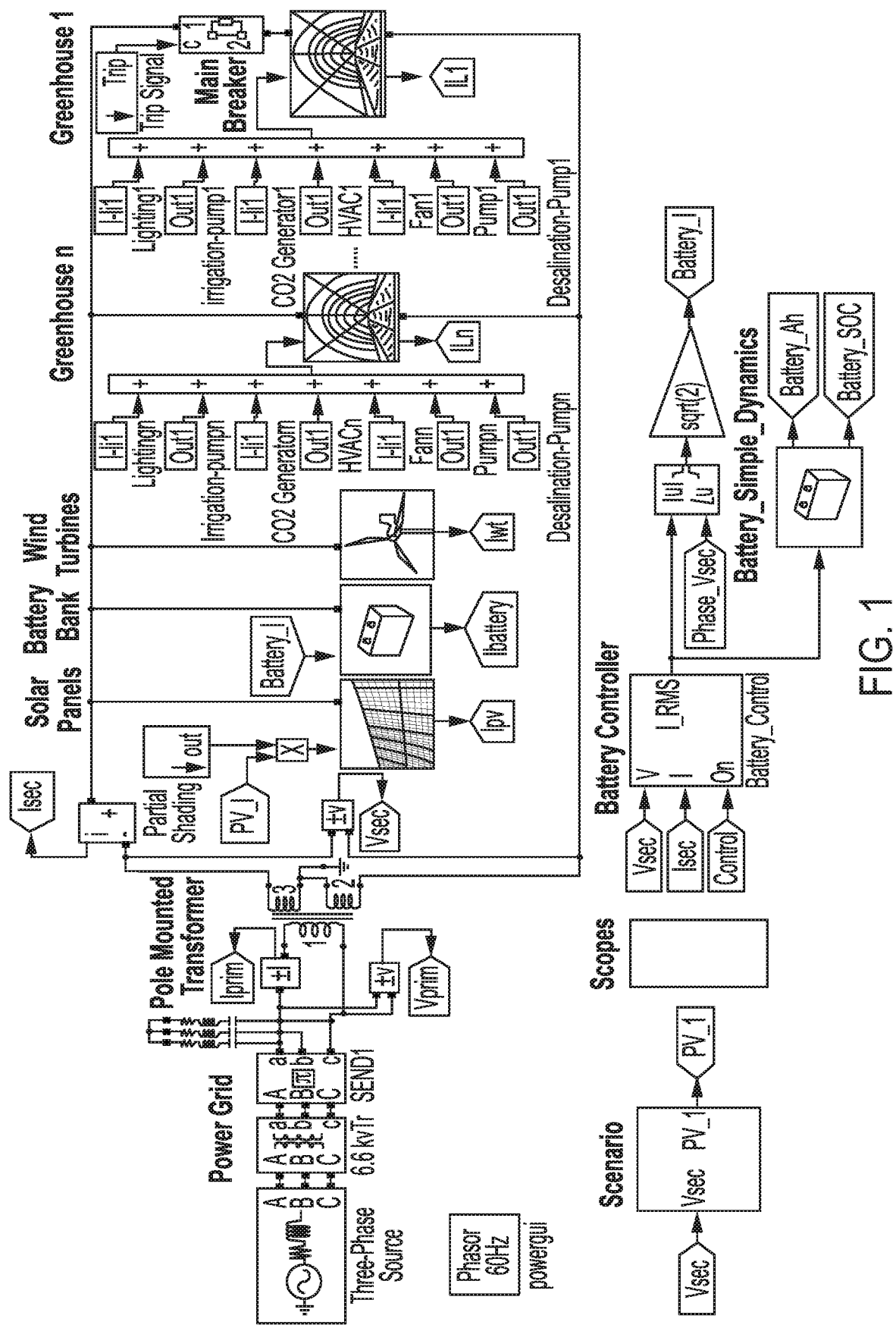
FIG. 1 illustrates an architecture of a microgrid, according to certain embodiments.

FIG. 1 illustrates an architecture of a microgrid, according to certain embodiments. Certain embodiments may provide a network of self-water producing smart greenhouses that utilize an enhanced desalination process. In some embodiments, the network of smart greenhouses may form a microgrid that enhances the quality and security of energy/water supply. According to certain embodiments, the microgrid may include distributed renewable energy sources, an energy storage system, sensors, electric and water loads, a communication and metering infrastructure, and an advanced management and monitoring system. According to certain embodiments, renewable generators or renewable energy resources may include, but not limited to, wind turbines, photovoltaic (PV) modules, and biomass units. Further, in certain embodiments, the energy storage system may include, for example, batteries, and the sensors may include $CO_2$ sensors to measure inside and/or outside $CO_2$ concentrations. Other embodiments may include wet sensors that measure soil properties including, for example, water content, electrical conductivity, and temperature. According to further embodiments, the sensors may include temperature sensors to measure the inside and/or outside temperatures, and may also include light sensors to measure an amount of light in greenhouses.

According to certain embodiments, the sensors may include sensors to measure reservoir water level and energy storage system state. In addition, the sensors may include sensors to measure sun irradiation power and light, and sensors to measure indoor and/or outdoor humidity. According to other embodiments the sensors may include sensors to measure outside wind speed, and sensors to measure internal air circulation. In some embodiments, the microgrid may include a water reservoir and pumps, and an algorithm may be provided to control and manage the systems.

In certain embodiments, sustainable microgrids may generate local socio-economic and environmental benefits. For instance, the microgrids may balance power productions and loads in a sustainable manner. Further, in a grid-connected configuration, the microgrid may be connected to the distribution network operator providing mutual benefits in selling/purchasing power. According to some embodiments, the microgrid may operate in island mode wherein the microgrid is not connected to an electric utility. In certain embodiments, while in island mode, the microgrid may achieve renewable energy autonomy through an energy storage unit to ensure the stability and the continuity of the service. According to further embodiments, each greenhouse may be considered as a self-regulating climate for optimal crop development. This may be advantageous in that it may provide farmers with a two-way communication infrastructure as well as advanced management tools to monitor the energy and water requirements, the excess of energy production, as well as provide an optimum growth atmosphere. Other embodiments may improve seawater greenhouses (SWGH) by optimizing the water production of the desalination process, which may be separated from the greenhouse but contiguous to it. In addition, the SWGH may use a wind-aided intensified evaporation (WAIV) and a solar pond to reduce brine production.

Figure 2:
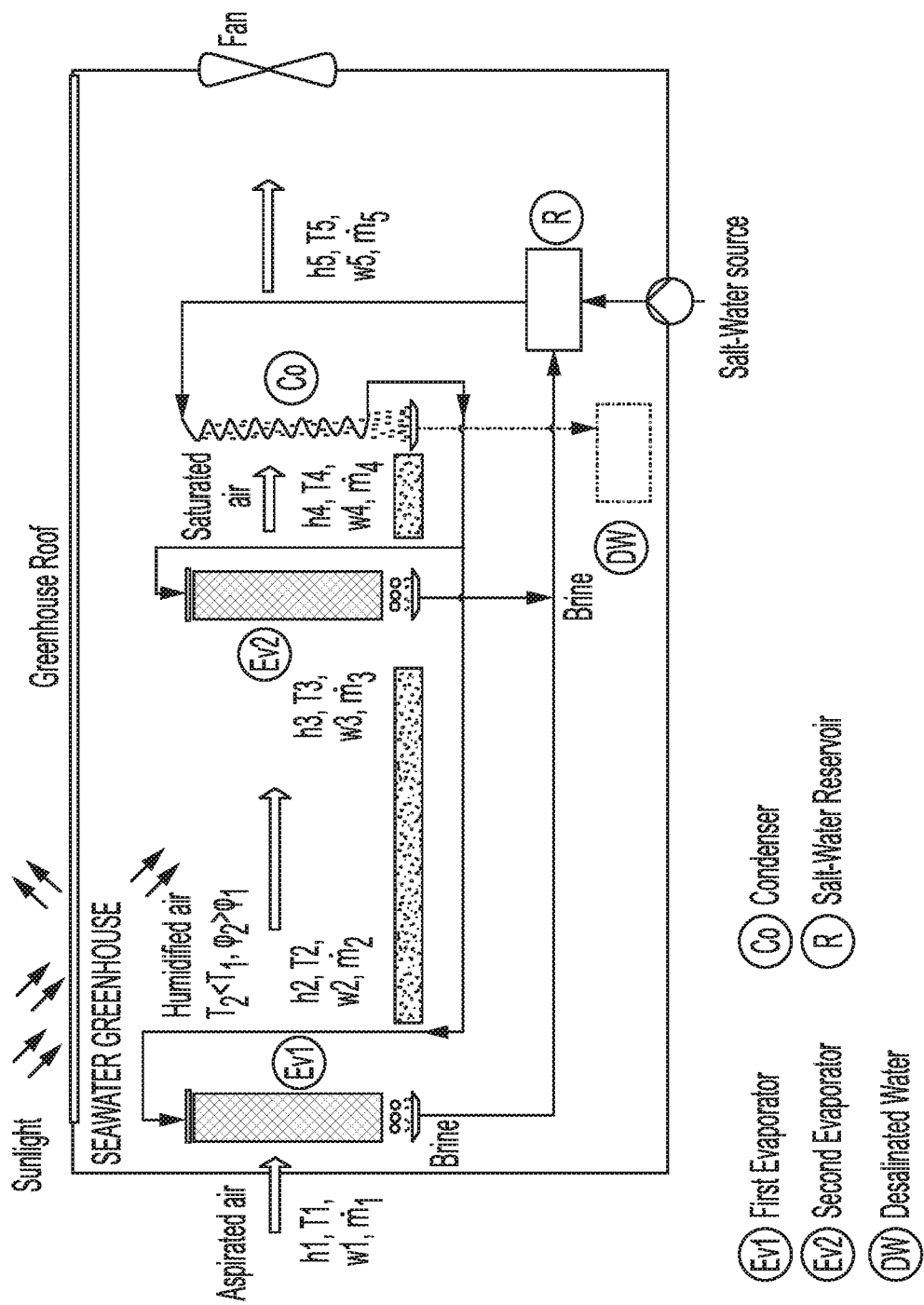
FIG. 2 illustrates a schematic of a seawater greenhouse, according to certain embodiments.

FIG. 2 illustrates a schematic of a seawater greenhouse, according to certain embodiments. In FIG. 2, $\dot{m}_1$ represents the air mass flow entering the first evaporator Ev1 (kg/s), T1 represents temperature of the outside air (° C.), w1 represents the absolute humidity of outside air, and h1 represents specific enthalpy of outside air (kJ/kg). These variables are similarly represented at $\dot{m}_2$, $\dot{m}_3$, $\dot{m}_4$, $\dot{m}_5$, T2, T3, T4, T5, w1, w2, w3, w4, w5, h2, h3, h4, and h5. In particular, these variables later describe the initial state of the air that may be changed when passing through the desalination unit. According to certain embodiments, these variables may define the thermophysical characteristics of the air entering the first evaporator Ev1, second evaporator Ev2, and condenser Co.

As illustrated in FIG. 2, the humidification and dehumidification (HDH) process may operate by extracting outside air into the greenhouse. The extracted air may cross a first evaporator Ev1 where the salt water trickles down as brine. By exchanging heat and humidity with the salt-water, the outside air cools down, and becomes humidified. Further, sunlight passing through the transparent cover of the greenhouse may heat the air, and consequently reduce the air relative humidity of the air. The air may then pass through a second evaporator Ev2, which may be similar to the first evaporator Ev1, where the air is humidified again until its saturation point. In the last stage, the hot and saturated air may pass through a condenser Co, and become cooled by the incoming salt-water stream in the condenser Co. In certain embodiments, along the condenser Co, the water vapor in the saturated air may condense and preheat the salt-water stream from the salt-water reservoir R. In addition, the condensed water may constitute the freshwater production of the installation, and may be collected in a desalinated water container DW. Further, the incoming salt water may be preheated in the condenser Co before flowing through the two evaporators Ev1, Ev2.

Figure 3:
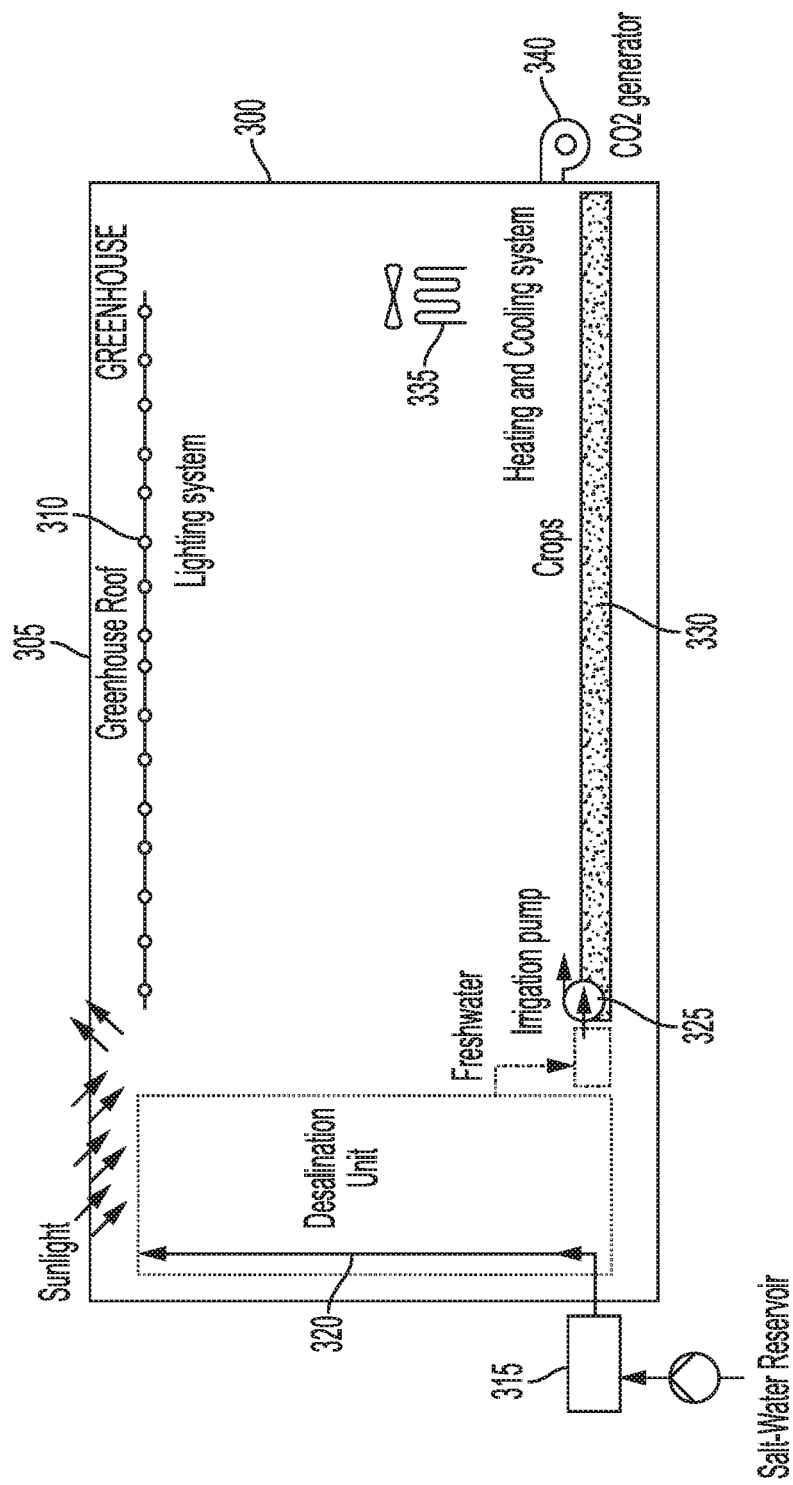
FIG. 3 illustrates a schematic of another seawater greenhouse, according to certain embodiments.

FIG. 3 illustrates a schematic of another seawater greenhouse, according to certain embodiments. In certain embodiments, greenhouses may be composed of several parts. One part may include a desalination unit, which is dedicated to produce fresh water locally for irrigation purposes, while another part may define the microclimate environment as illustrated in FIG. 3. For instance, FIG. 3 illustrates a SWGH 300 that includes a greenhouse roof 305, and an interior lighting system 310. Connected to the SWGH 300 is a salt-water reservoir 315, which provides salt-water to a desalination unit 320 of the SWGH 300. The desalination unit 320 is capable of producing freshwater from the salt-water reservoir, and using the freshwater to irrigate the crops 330 via an irrigation pump 325 connected to the desalination unit 320. As illustrated in FIG. 3, the SWGH 300 may also include a dedicated HVAC system 335, and a $CO_2$ generator 340.

As noted above, certain embodiments provide a microgrid powered network of self-water producing greenhouses, which may be based on renewable energy resources. Certain embodiments also provide an integrated framework based on multi-input and multi-output information including, for example, integrating stochastic behavior of weather conditions, water availability, and fluctuations of renewable energy sources and storage dynamics. According to certain embodiments, the framework may include an energy management and monitoring system for managing and monitoring future operation of the self-water producing greenhouses, which can consider uncertainties and stochastic dynamics of weather data, renewable power production, and indoor environment variables. In certain embodiments, the management and monitoring system may predict the solar irradiation, and then the water production of the desalination unit. As will be discussed in more detail herein, the master controller may decide the management of the water production of the desalination unit.

According to certain embodiments, management and monitoring system may include a management unit that may be configured to optimize the greenhouse's autonomous operation. For instance, in certain embodiments, the management unit may use data gathered from different sensors available on-site at each greenhouse to compute a predicted amount of power generated from the renewable resources (e.g., solar and wind sources), outdoor conditions, and the electric load demands for a certain period of time such as, for example, a few minutes or hours ahead. According to certain embodiments, the different sensors may be located inside and outside the greenhouse, and such sensors may include those previously described herein. According to other embodiments, the amount of time for the electric load demands may be defined by the user. However, in certain embodiments, the time may be set between 15 minutes to 1 hour.

In addition, the management unit may transfer the predictions to a master controller that may be configured to deliver optimal control strategies for various systems in the network including, for example, the greenhouses. According to certain embodiments, a model predictive control (MPC) based optimization problem may be solved for an entire time horizon and at each time step. For instance, in certain embodiments, the MPC may apply the first optimal signal at the current time step, and move to solve the optimization problem at the next time step considering new prediction data. In certain embodiments, the control signals may define the optimal operation of each system at each time step, where the systems may include, for example, energy storage systems, renewable generators, pumps, $CO_2$ generators, artificial lightings, HVAC units, fans, and ventilations. In certain embodiments, the controller may be running following a receding scheme. In addition, the controller may be running at each time step considering new predictions based on updated data coming from the sensors.

In certain embodiments, the master controller may implement a predictive algorithm model at the network level, and may be in charge of controlling the entire network of greenhouses. The master controller may also provide optimal set points for various sub-systems (e.g., energy storage system, renewable generators, pumps, $CO_2$ generators, artificial lighting, HVAC units, fans, and ventilation), and regulate the dynamics and uncertainties of wind speeds and solar irradiation by pumping water to the main reservoir (e.g., salt-water reservoir) and/or by sending surplus power to the main grid (see FIG. 1), or alternatively sending the energy to the batteries. In addition, the master controller may make decisions on the optimal manner to dispatch the excess renewable energy production. Nevertheless, in case of a shortage of energy production, the master controller may satisfy the needs of the network by obtaining energy from the main grid and/or batteries. According to certain embodiments, the mater controller may regulate the entering air mass flow according to the climate conditions to enhance the performance of the desalination unit for freshwater production. This may affect the rejected brine and, thus, the operation of the WAIV unit. In other embodiments, the master controller may decide the future operation of the local pumps according to the predicted freshwater production.

According to certain embodiments, the management and monitoring system may include a predictive controller that may be configured to implement an algorithm. In certain embodiments, upon executing the algorithm, the predictive controller may initialize, at time t=1, with the actual current state of the network (i.e., batteries, loads, and renewable energy power generation). In certain embodiments, the time is not limited to t=1, but can be set to a particular value by the user. Further, according to certain embodiments, initialization may correspond to the initial state of the systems. In some embodiments, the optimization problem may be solved using these data for the entire time horizon, and at each time step. Further, the MPC may apply the first optimal signal at the current time step and move to solve the optimization problem at the next time step considering new prediction data.

The predictive controller may also compute an optimal control sequence for a selected rolling optimization horizon (Nc), based on data predictions for future prediction periods (Np). According to certain embodiments, the optimal control sequence may correspond to the best and adequate solution. Further, the control sequence or signals may define the optimal operation of each system (e.g., energy storage system, renewable generators, pumps, $CO_2$ generators, artificial lightings, HVAC units, fans, and ventilation) at each time step. In certain embodiments, the prediction horizon may refer to a fixed time interval in the future at which predictions ahead are performed. In certain embodiments, this may be a variable, which may be decided by the user. In addition, the predictive controller may implement a first control period operation of a scheduling problem, and update information available in each greenhouse for the next period.

Figure 4:
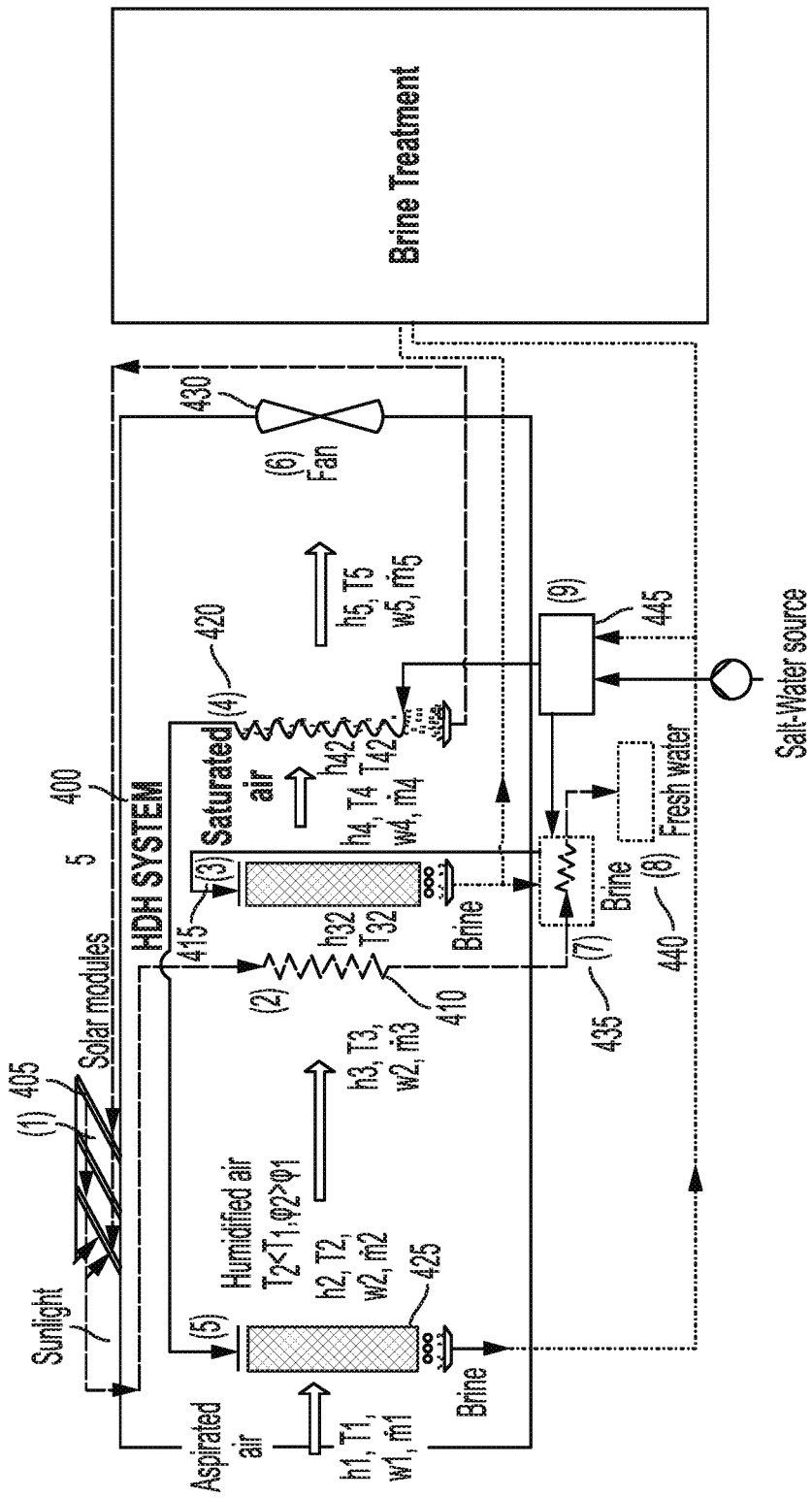
FIG. 4 illustrates a schematic of a desalination system, according to certain embodiments.

In certain embodiments, the MPC based optimization problem may be solved for the entire horizon and at each time step. The MPC may apply the first optimal signal at the current time step, and move to solve the optimization problem at the next time step considering new prediction data (e.g., wind speed, humidity rate, $CO_2$ rate, solar irradiation, and temperature). According to certain embodiments, the control signals may define the optimal operation of each system at each time step (e.g., energy storage system, renewable generators, pumps, $CO_2$ generators, artificial lightings, HVAC units, fans, and ventilation). After the information is updated, the predictive controller may move to the next sampling instant, and repeat the same algorithm. According to certain embodiments, the high-level control may generate optimal set points for all the pumps, batteries, and power exchanges with the main grid. According to certain embodiments, the optimal set points may refer to the best and adequate set points determined by resolving the optimization problem. The optimal set points may also define the best operation states of the various systems FIG. 4 illustrates a schematic of a desalination system, which is composed by two main parts: desalination compartment including elements 405 to 445 as well as a brine treatment unit, according to certain embodiments. In certain embodiments, the SWGH may include a desalination system that produces both salt and freshwater from seawater or brackish water to guarantee the dynamic irrigation water load continuously. As illustrated in FIG. 4, the desalination compartment may include brine container 435, a freshwater container 440, and salt-water reservoir 445. The desalination compartment may also include one or more solar modules or solar water heaters 405 which can assist the desalination system in increasing freshwater production. According to certain embodiments, the solar water heaters 405 may be installed on the roof of the desalination compartment 400. According to certain embodiments, the desalination compartment 400 may increase freshwater production rate via the use of the solar water heaters 405, and via the addition of an air/water heat exchanger 410 before reaching the second evaporator 415 of the desalination compartment.

According to certain embodiments, freshwater produced at the condenser level 420 may be driven to the solar water heaters 405 where it may be warmed up. The warmed freshwater may then be directed to the desalination compartment where it passes through the added air/water heat exchanger 410 set before the second evaporator 415. As illustrated in FIG. 4, the air/water heat exchanger 410 may be positioned perpendicular to a direction of airflow in the desalination compartment so that it may warm the flowing air. Once heated, the air may achieve better capacity to be humidified when it passes through the second evaporator 415. Thus, in certain embodiments, the freshwater production rate may be greater at the condenser 420 than at the condenser illustrated in FIG. 2. Further, the humidified air may pass from the second evaporator 415 through the condenser 420, at which point the freshwater produced at the condenser 420 may be driven to the solar water heaters 405. After the condenser 420, the air may pass through a fan 430 where it is dispersed back toward the first evaporator 425.

Figure 5:
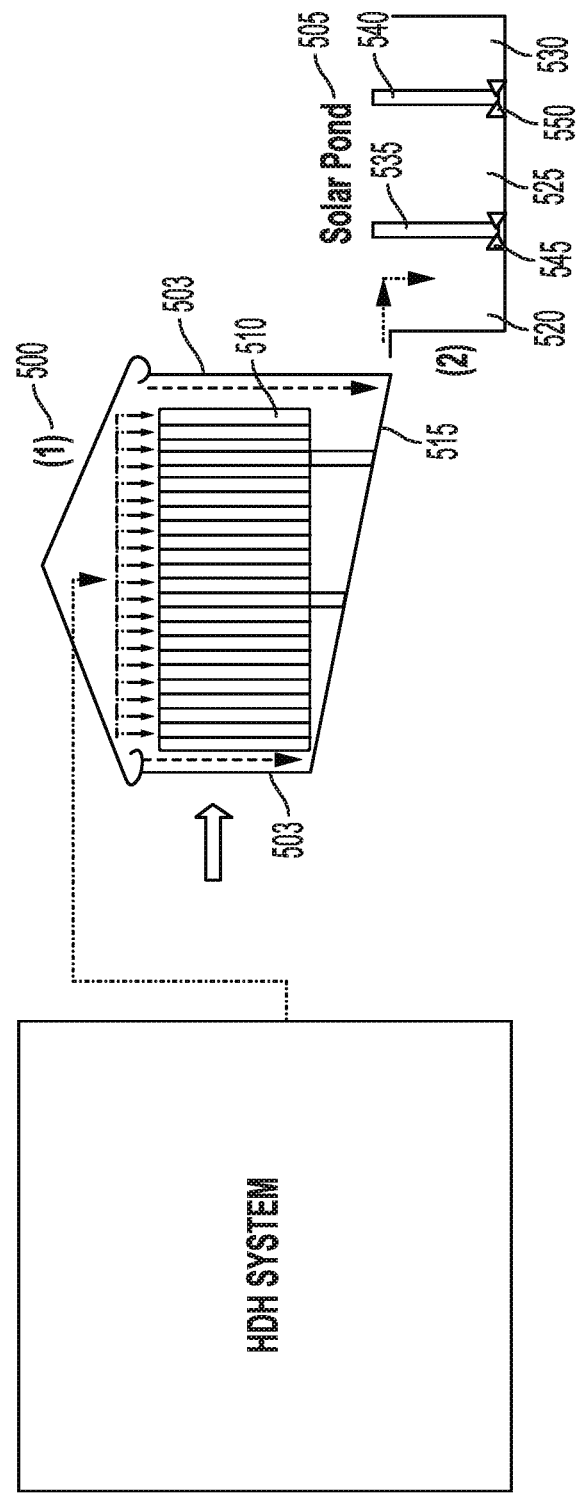
FIG. 5 illustrates a schematic of a brine treatment part of the desalination system, according to certain embodiments.

FIG. 5 illustrates a schematic of a brine treatment part of the desalination system, according to certain embodiments. As illustrated in FIG. 5, the desalination system may reduce brine production via the use of a wind-aided intensified evaporation (WAIV) unit and a solar pond. According to certain embodiments, the WAIV unit may be placed on an inclined surface 515, overhung by a plastic cover, and connected to a solar pond 505. In some embodiments, the brine produced in the desalination system may be distributed across the top of the WAIV, at which point the brine may fall on hydrophilic, black and vertical plastic films 510, oriented parallel to the prevailing wind direction. According to certain embodiments, solar radiation and wind passing through the gaps in the sails may cause evaporation of the water. As the water evaporates, the water vapor rises and condenses on the glass surface 503 for collection. The condensed water contributes to the increase of the freshwater production and the concentration of the brine. According to certain embodiments, the freshwater may be collected and stored in the freshwater reservoir 440, and the brine may be collected in the brine container 435.

According to certain embodiments, the concentrated brine may be collected in a solar pond 505 by gravity via the inclined surface 515. As illustrated in FIG. 5, the solar pond 505 may be divided into three compartments 520, 525, and 530. However, in other embodiments, the number of compartments may be or more less than three. In some embodiments, the brine may fill the first compartment 520, and a concentration gradient may be established as the first compartment 520 fills up. The gradient may be established in water that is heavily salinated collecting at the bottom of the solar pond 505. Once the first compartment 520 is filled, a valve 545 at the bottom of a partition wall 535 separating the first compartment 520 from the second compartment 525 may open, allowing the brine in the first compartment 520 to flow into the second compartment 525. The brine concentration in the second compartment 525 may be higher than in the first compartment 520. Once the second compartment 525 is filled, a second valve 550 at the bottom of another partition wall 540 separating the second compartment 525 from the third compartment 530 may open. Once the valve at the bottom of the second partition wall 540 is opened, the brine may fill the third compartment 530 from the second compartment 525. The brine in the third compartment 530 may be more concentrated than the brine in the second compartment 525. According to certain embodiments, the high concentrated brine may be removed from the third compartment 530, and may be used for production purposes including, for example, producing table salt or chemicals for industry.

Figure 6:
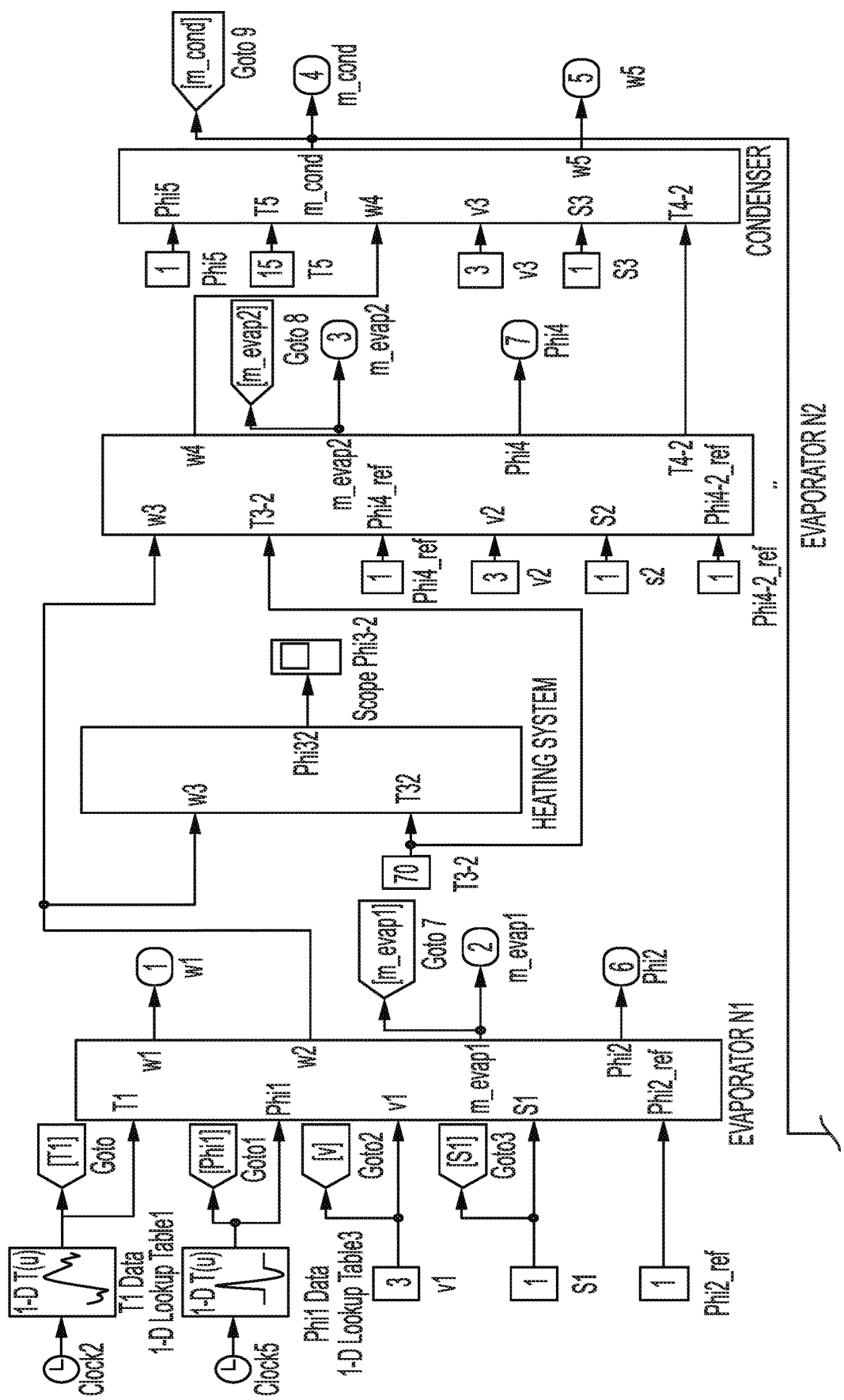
FIG. 6 illustrates a design of a greenhouse, according to certain embodiments.
Figure 6:
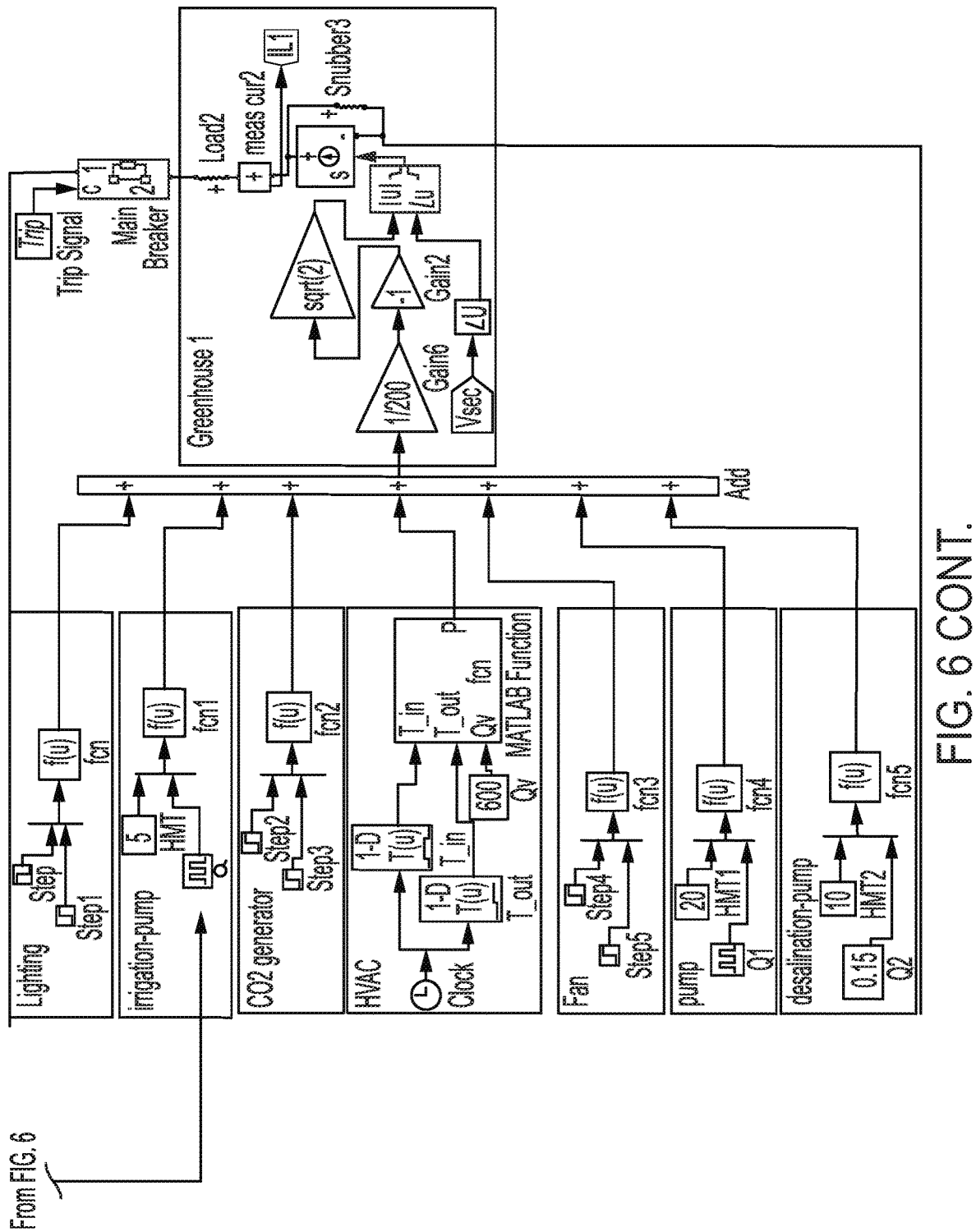

FIG. 6 illustrates a design of a greenhouse, according to certain embodiments. According to certain embodiments, the greenhouse may be composed of two main parts. The first part may include the desalination system dedicated to produce clean water locally for irrigation purposes, while the second part defines the microclimate environment. Here, FIG. 6 illustrates a model of the desalination system devoted to providing dynamic irrigation water load continuously. According to certain embodiments, this unit may use a humidification-dehumidification process to produce freshwater from seawater or brackish water. Furthermore, FIG. 6 illustrates reporting the microclimate unit model that includes artificial lighting, $CO_2$ generator, HVAC system, fans, local pump, and natural ventilation.

According to certain embodiments, the time varying of freshwater production of the desalination unit may be affected by the climate conditions, and may follow the solar irradiation gathered from the available sensor. According to other embodiments, the master controller may regulate the entering air mass flow according to the climate conditions to enhance the performance of the desalination unit for freshwater production, which may affect the rejected brine, and therefore the operation of the WAIV unit. In addition, the master controller may decide the future operation of the local pumps according to the predicted freshwater production.

Figure 7:
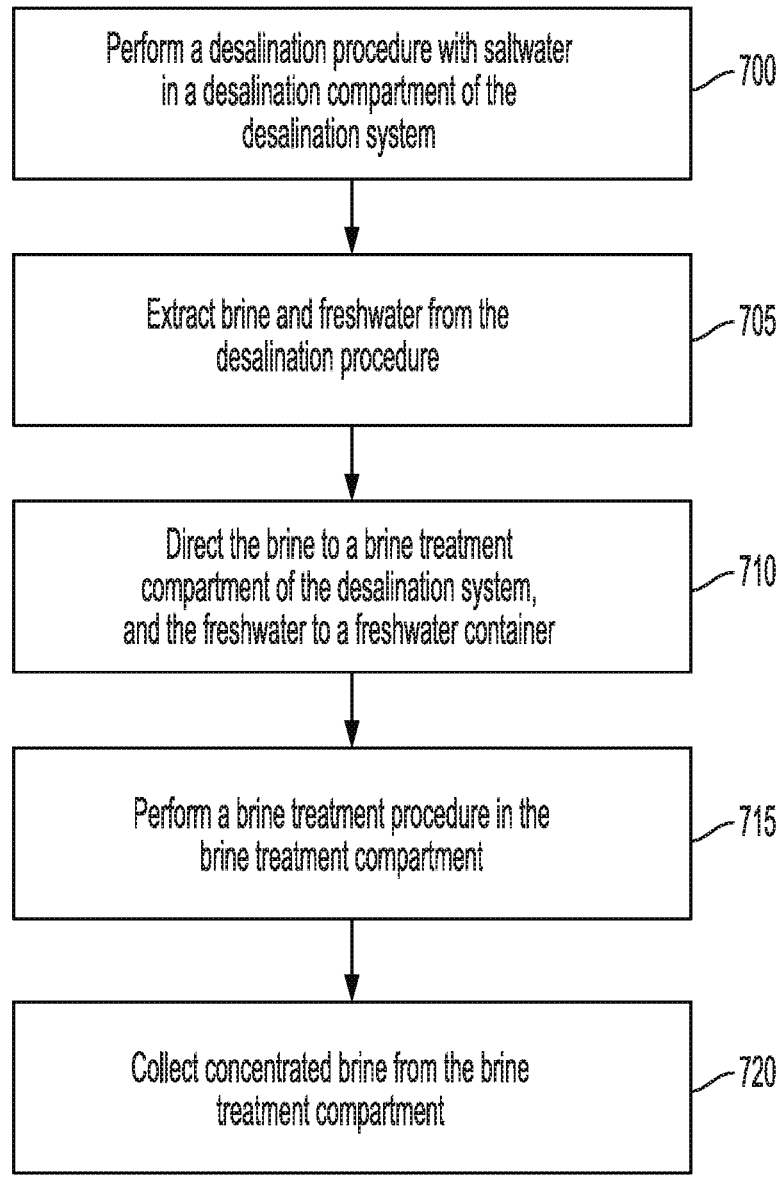
FIG. 7 illustrates a flow diagram of a method, according to certain embodiments.

FIG. 7 illustrates a flow diagram of a method, according to certain embodiments. In certain embodiments, the flow diagram of FIG. 7 may be performed by a desalination system, which may be controlled by a controller similar to apparatus 10 illustrated in FIG. 8. According to certain embodiments, the method of FIG. 7 may include, at 700, performing a desalination procedure with salt-water in a desalination compartment of the desalination system. The method may also include, at 705, extracting brine and freshwater from the desalination procedure. The method may further include, at 710, directing the brine to a brine treatment compartment of the desalination system, and the freshwater to a freshwater container. In addition, the method may include, at 715, performing a brine treatment procedure in the brine treatment compartment. Further, the method may include, at 720, collecting concentrated brine from the brine treatment compartment.

According to certain embodiments, the desalination procedure may include extracting air from an exterior environment, cooling and humidifying the air with a first evaporator, heating the air from the first evaporator with a heat exchanger, humidifying the air from the heat exchanging to a saturation point with a second evaporator, condensing the water vapor in the air from the second evaporator with a condenser, collecting freshwater at the condenser from the condensed air, and brine at the second evaporator, driving the freshwater to a solar heater to warm the freshwater, and directing the warmed freshwater to the heat exchanger. According to other embodiments, the brine treatment procedure may be a wind-aided intensified evaporation procedure.

According to further embodiments, the brine treatment procedure may include distributing the brine across a plurality of vertical plastic films oriented parallel to a prevailing wind direction, collecting condensed water on a wall surface of the brine treatment compartment, storing the freshwater in the freshwater container, filling a solar pond with the brine, the solar pond comprising a plurality of compartments separated by a plurality of partition walls, and transferring the brine through the plurality of compartments via a valve in each of the plurality of partition walls linking each of the plurality of compartments. In certain embodiments, the heat exchanger may be disposed perpendicularly to a direction of the air flow, and may be disposed between the first evaporator and the second evaporator. In some embodiments, the solar pond may be filled with the brine by gravity via an inclined surface located beneath the plurality of vertical plastic films. In other embodiments, the wall surface may be a glass surface. According to certain embodiments, the method may include controlling the desalination procedure and the brine treatment procedure based on one or more sensor readings of environmental conditions, and based on renewable energy resources.

Figure 8:
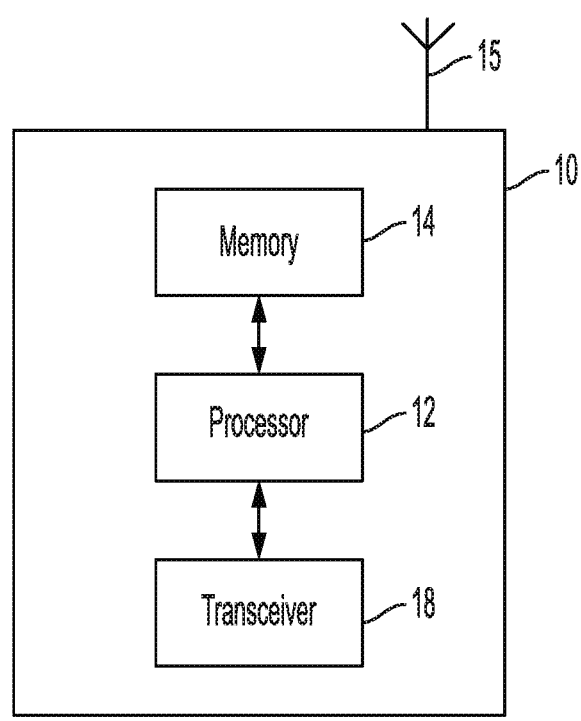
FIG. 8 illustrates an apparatus, according to certain embodiments.

FIG. 8 illustrates an apparatus according to certain embodiments. According to certain embodiments, apparatus 10 may be a controller including, for example, a controller for SWGHs, a microgrid, and a desalination system. As described herein, a controller may alternatively be referred to as, for example, a computer, hardware device, mobile device, or the like.

In some example embodiments, apparatus 10 may include one or more processors, one or more computer-readable storage medium (for example, memory, storage, or the like), and/or a user interface. It should be noted that one of ordinary skill in the art would understand that apparatus 10 may include components or features not shown in FIG. 8.

As illustrated in the example of FIG. 8, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some embodiments, apparatus 10 may also include or be coupled to one or more antennas 15 for receiving a signal and for transmitting from apparatus 10. Apparatus 10 may further include a transceiver 18 configured to transmit and receive information. For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with other hardware elements described herein via a wireless or wired communications link.

According to certain example embodiments, processor 12 and memory 14 may be included in or may form a part of processing circuitry or control circuitry. In addition, in some embodiments, transceiver 18 may be included in or may form a part of transceiving circuitry. As discussed above, according to certain example embodiments, apparatus 10 may be a controller for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to perform a desalination procedure with salt-water in a desalination compartment of the desalination system. Apparatus 10 may also be controlled by memory 14 and processor 12 to extract brine and freshwater from the desalination procedure. Apparatus 10 may further be controlled by memory 14 and processor 12 to direct the brine to a brine treatment compartment of the desalination system, and the freshwater to a freshwater container. In addition, apparatus 10 may be controlled by memory 14 and processor 12 to perform a brine treatment procedure in the brine treatment compartment. Further, apparatus 10 may be controlled by memory 14 and processor 12 to collect concentrated brine from the brine treatment compartment.

Certain embodiments described herein provide several technical improvements, enhancements, and/or advantages. In some example embodiments, it may be possible to enhance food production, promote integration and use of clean and sustainable renewable energy, and transition into precision agriculture. Certain embodiments may also improve transition to smart agriculture in terms of self-management, self-optimization, as well as secure operation in a much more feasible way. Additionally, certain embodiments may provide a practical and efficient solution to resolve the challenging issues related to energy and water saving. Certain embodiments may further provide improvements to SWGHs by optimizing the water production of the desalination process. Some embodiments may also improve sustainable water/energy supply, and support agriculture to meet the growing number of regulations on environment and quality, and minimize the effects of climate change. In other embodiments, it may be possible to provide famers with a two-way communication infrastructure and advanced management tools to monitor the energy and water requirements, and the excess of energy production, as well as provide an optimum growth atmosphere.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

We claim:

1. A method for controlling a desalination system, comprising:
    performing a desalination procedure with salt-water in a desalination compartment of the desalination system;
    extracting brine and freshwater from the desalination procedure;
    directing the brine to a brine treatment compartment of the desalination system, and the freshwater to a freshwater container;
    performing a brine treatment procedure in the brine treatment compartment by a wind-aided intensified evaporation unit positioned on an inclined surface; and
    collecting concentrated brine from the brine treatment compartment.

2. The method for controlling the desalination system according to claim 1, wherein the desalination procedure comprises:
    extracting air from an exterior environment;
    cooling and humidifying the air with a first evaporator;
    heating air from the first evaporator with a heat exchanger;
    humidifying air from the heat exchanger to a saturation point with a second evaporator;
    condensing water vapor contained in humid air from the second evaporator with a condenser;
    collecting freshwater at the condenser from the condensed air, and brine at the second evaporator;
    driving the freshwater to a solar heater to warm the freshwater; and
    directing the warmed freshwater to the heat exchanger.

3. The method for controlling the desalination system according to claim 2, wherein the heat exchanger is disposed perpendicularly to a direction of air flow, and disposed between the first evaporator and the second evaporator.

4. The method for controlling the desalination system according to claim 1, wherein the brine treatment procedure comprises:
    distributing the brine across a plurality of vertical plastic films oriented parallel to a prevailing wind direction;
    collecting condensed water on a wall surface of the brine treatment compartment;
    filling a solar pond with the brine, the solar pond comprising a plurality of compartments separated by a plurality of partition walls; and
    transferring the brine through the plurality of compartments via a valve in each of the plurality of partition walls linking each of the plurality of compartments.

5. The method for controlling the desalination system according to claim 4, wherein the solar pond is filled with the brine by gravity via an inclined surface located beneath the plurality of vertical plastic films.

6. The method for controlling the desalination system according to claim 4, wherein the wall surface is a glass surface.

7. The method for controlling the desalination system according to claim 1, further comprising controlling the desalination procedure and the brine treatment procedure based on one or more sensor readings of environmental conditions, and based on renewable energy resources.

* * * * *